United States Patent [19]

Wisler et al.

[11] Patent Number: 4,625,173
[45] Date of Patent: Nov. 25, 1986

[54] SYSTEM FOR MONITORING FORMATION SPONTANEOUS POTENTIAL AND POLARIZATION CONSTANT WHILE DRILLING

[75] Inventors: MacMillan M. Wisler, Lafayette, La.; James R. Birchak; Richard A. Meador, both of Spring, Tex.

[73] Assignee: NL Industries, Inc., New York, N.Y.

[21] Appl. No.: 595,251

[22] Filed: Mar. 30, 1984

[51] Int. Cl.$^4$ .............. G01V 3/00; G01V 3/08/3/18
[52] U.S. Cl. ................................ 324/351; 324/347; 324/356
[58] Field of Search ............... 324/351, 352, 353, 347, 324/348, 356, 369

[56] References Cited

U.S. PATENT DOCUMENTS

| 2,557,168 | 6/1951 | Arps et al. | 324/356 |
| 2,650,067 | 8/1953 | Martin | 324/356 X |
| 2,694,179 | 11/1954 | Walstrom | 324/351 |
| 3,134,069 | 5/1964 | Clements et al. | 324/369 |

Primary Examiner—Reinhard J. Eisenzopf
Assistant Examiner—Robert W. Mueller
Attorney, Agent, or Firm—Browning, Bushman, Zamecki & Anderson

[57] ABSTRACT

An electrode insulated from and mounted to the outside of a drill collar in a drill string positioned in a borehole is used for measuring formation spontaneous potential. A current measuring device, such as an ammeter, is connected through a varible ammeter resistor and a switch between the electrode and the drill collar. The ammeter measures current flow from the formation along the walls of the borehole to the drill string to determine the spontaneous potential of the formation at various points along the borehole while it is being drilled. The switch in the ammeter circuit is interrupted at a pre-selected rate and the ammeter current signal is connected through a lock-in amplifier to cancel random noise in the signal and produce an accurate measurement of the very small currents flowing between the electrode and the drill collar. The currents are indicative of spontaneous potentials in the formation. The value of the ammeter resistor is varied and the frequency of closure of the switch is swept over a pre-selected range to measure the time constant of the polarization of the formation along the borehole.

8 Claims, 3 Drawing Figures

SYSTEM FOR MONITORING FORMATION SPONTANEOUS POTENTIAL AND POLARIZATION CONSTANT WHILE DRILLING

BACKGROUND OF THE INVENTION

1. Field of the Invention

The invention relates to measurement of formation parameters while drilling in a borehole and, more particularly, to the measurement of spontaneous potentials and polarization time constants of earth formations.

2. Description of the Background

In exploration and production of petroleum products from formations within the earth, numerous techniques are used to determine the location of petroleum bearing formations along a borehole. For example, there is a well established relationship between formation conductivity and the permeability of a formation and, hence, the likelihood of obtaining petroleum from that formation. Thus, it is conventional to measure the electrical conductivity of different formations along a borehole and utilize a log of formation conductivities as a function of depth to determine where to initiate attempts to extract oil from the formations.

One of the physical characteristics of the layering of different formations such as shales, sands and clays, one upon the other within the geological strata of the earth, is that different ones of these formations have different permeabilities. An effect of the different permeabilities of contiguous formations is that they each have different filtering effects upon ionized particles within the fluids contained in the formations. Thus, earth formations tend to have different resistances to the movement of ions through the formations and, consequently, ions tend to collect along the interfaces between unlike formations. This selective filtration of ions results in differences in electric potentials due to positive ion accumulation within different formations, particularly at the interfaces at adjacent dissimilar formations. This is referred to as the spontaneous potential or self-potential of a formation and often called SP for short.

When a borehole is drilled into the earth and passes through different formations, it is well-known that the potential difference with respect to an earth reference potential at the surface will vary along the length of the borehole. It is also well-known that a log of spontaneous potentials of the formations along the length of the borehole provides additional information as to the nature of the formations along the borehole and, hence, the formations most likely to be productive of petroleum.

Conventionally, spontaneous potential logs of a borehole are prepared by removing the drill stem from the hole and lowering an insulative sonde carrying an electrode down into the borehole. Measurement is made as soon as possible after removal of the string to minimize the invasion of the formations by the fluids contained within the borehole. The electrode in the sonde is connected to the surface by an insulated conductive cable upon which the sonde is lowered. A log is prepared of the electrical potential values measured by the electrode with respect to an earth potential reference point at the surface adjacent the borehole. This SP log is correlated with other logs such as conductivity to produce a fuller picture of the structure and composition of the subterranean formations along the borehole. The two major difficulties with conventional SP logging are that the drill string must be removed from the borehole before measurement and the measurements must be made relatively quickly after string removal and prior to substantial invasion of the formations by borehole fluids.

It would be highly desirable to be able to measure spontaneous potential of each formation along a borehole while the borehole is being drilled. This is true from the standpoint of early measurement prior to invasion by borehole fluids and as a continuous real time indication of the nature and characteristics of the formations being penetrated by the drill string during the drilling operation. The essence of a measurement while drilling system is to provide to the drilling operator a continuous flow of various data which are indicative of conditions within the borehole. In this manner, a drilling operator can anticipate and avoid potentially dangerous situations such as the unexpected penetration of a high pressure formation which can result in the uncontrolled flow of high pressure combustible gasses into the borehole. The latter event is known as a "blowout". The more information which can be supplied to a drilling operator during the drilling operation, the more safely and efficiently the borehole can be drilled. Measurement of spontaneous potential of each formation during a drilling operation would thus be very desirable.

The major problem which exists with measuring spontaneous potential during a drilling operation is that the highly conductive steel drill collar essentially shorts out the small spontaneous potentials which exist along the borehole. Certain techniques have been suggested in an attempt to measure the spontaneous potential while a drill string is positioned in the borehole. For example, one technique employs two longitudinally spaced electrodes positioned on, and insulated from, the drill string. These two electrodes measure the differences in the spontaneous potential at different points along the formation wall in the borehole. However, there is no direct way in which this difference potential can be related to an absolute spontaneous potential with respect to an earth reference point at the surface.

The phenomenon of spontaneous potential within earth formations is also directly related to formation polarization. Due to the fact that ionized particles are unevenly dispersed among the layers of material comprising the formations along a borehole, there exists a certain charge polarization across the spatially separated formations. This polarization phenomenon is also indicative of the geophysical nature of the formations and, is useful for identifying zones containing fluids. Polarized regions among earth formations are separated from one another by conductive fluids, such as salt water, which act as electrolytes separating the spatially separated layers of charge. By measuring and evaluating the polarization time constants of earth formations, additional information concerning the nature and shape of the formations may be obtained. Heretofore, very few techniques have existed for evaluating these very subtle relationships among charged regions dispersed within the formations surrounding a borehole.

The system of the present invention overcomes the difficulties of the prior art in the measurement of spontaneous potential along the borehole. Additionally, the present invention provides a means for measuring the spatial distribution of polarization time constants indicative of the concentration of charged ions due to ionic filtration of the formations and provides additional information as to the geophysical structure of the formations penetrated by the borehole.

SUMMARY OF THE INVENTION

The present invention includes a system for measuring the spontaneous potential of earth formations by measuring the current flow from ionic charges concentrated within the formations surrounding a borehole to the drill string. More particularly, the invention includes a system for measuring the current flow between a drill string and a conductive electrode positioned about the drill string and insulated therefrom. The current flow path is periodically interrupted at a preselected rate through an ammeter resistor so that the output signal may be processed by a phase locked amplifier to eliminate random ambient noise within the system.

In another aspect, the system of the invention provides for spontaneous potential logging of a borehole by the measurement of ionic current flow between the formation surrounding the borehole and the drill string. The system includes a conductive cylindrical section of drill string with a conductive electrode positioned adjacent, but insulated from, the conductive section of drill string. The electrode is secured in electrically conductive communication with conductive drilling fluids between the drill string and the earth formations forming the borehole walls. Means are provided for electrically connecting the conductive drill string and the electrode forming an electrically conductive path therebetween. Means are also provided for measuring the current flow through the electrically conductive path when the electrode and the drill string are electrically connected. The current flow is indicative of the spontaneous potential of earth formations adjacent the electrode.

In yet another aspect, the invention includes a system for measuring the polarization time constant of earth formations. The system comprises a conductive cylindrical sub connected as part of the drill string in a system forming a borehole. A conductive electrode is positioned adjacent the sub and electrically insulated therefrom while in electrical communication with the potential of the formations adjacent the borehole. A selectively interruptable path between the conductive electrode and the conductive sub is also provided with means for interrupting the path at a pre-selected rate. The interruption of the path reduces current flow through the path indicative of the time constant of said earth formations.

BRIEF DESCRIPTION OF THE DRAWING

For a more complete understanding of the present invention and for further objects and advantages thereof, reference may now be had to the following description taken in conjunction with the accompanying drawings in which.

DETAILED DESCRIPTION

Figure 1:
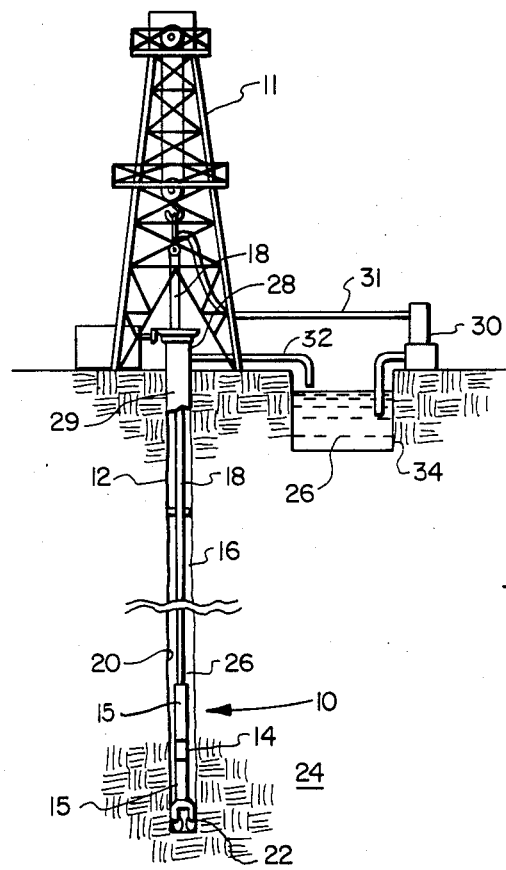
FIG. 1 is a diagrammatic, side elevational view of a borehole drilling operation illustrating the measurement of spontaneous potentials of the formation in accordance with the principles of the present invention.

Referring first to FIG. 1, there is shown a drilling rig 11 disposed atop a borehole 12. A first embodiment of the system 10 for measuring spontaneous potential is carried by a sub 14 comprising a portion of drill collar 15 and disposed within the borehole 12. The system 10 is provided for measurement of spontaneous potential and the polarization time constant of formations exposed within a borehole. Electrical potential current measurements are made of the currents flowing between the formation and the drill collar due to spontaneous potential.

Still referring to FIG. 1, a drill bit 22 is disposed at the lower end of drill string 18 and carves the borehole 12 out of the earth formations 24 while drilling mud 26 is pumped from the wellhead 28. Metal surface casing 29 is shown to be positioned in the borehole 12 above the drill bit 22 for maintaining the integrity of the borehole 12 near the surface. As described below, the present invention permits accurate measurement of spontaneous potential and polarization time constant in a measuring-while-drilling configuration. The annulus 16 between the drill string 18 and the wall 20 creates a theoretically closed return mud flow path. Mud is pumped from the wellhead 28 by a pumping system 30 through mud supply line 31 coupled to the drill string 18. Drilling mud is, in this manner, forced down the central axial passageway of the drill string 18 and egresses at the drill bit 22 for carrying cuttings comprising the drilled section of earth, rock and related matter upwardly from the drill bit to the surface. A conduit 32 is supplied at the wellhead for channeling the mud from the borehole 18 to a mud pit 34. The drilling mud is typically handled and treated by various apparatus (not shown) such as outgassing units and circulation tanks for maintaining selected viscosity and consistency of the mud. The measurement of current flow from the formation and/or the conductive drilling muds together with the electrical model of the formation and mud resistivity permits the calculation of absolute spontaneous potential during the pumping of drilling fluid through the drill string.

Continuing to refer to FIG. 1, there is shown a sub 14 and drill collar 15 comprising a portion of the system 10 of the present invention in a downhole environment. The system 10 is constructed to generate a series of signals for telemetry to the wellhead or a downhole recording system indicative of the spontaneous potential and polarization time constants of the adjacent formation. This information is obtained from electrodes and equipment disposed in the sub 14 as will be described in more detail below. The requisite telemetry and analysis systems are deemed to be of conventional design and are not specifically set forth or addressed herein. The method of measurement of formation spontaneous potential and polarization time constant is, however, described in detail below and is the subject of the present invention.

Figure 2:
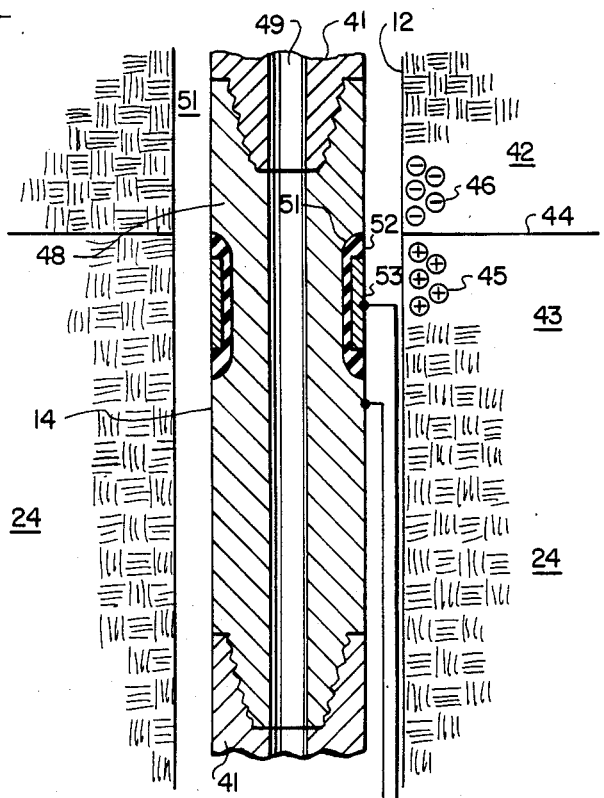
FIG. 2 is an enlarged, side elevational, cross-sectional view of one embodiment of a downhole sub for spontaneous potential measurement and blocked diagram schematic thereof constructed in accordance with the teachings of the present invention.

Referring now to FIG. 2, there is shown a diagrammatic, cross-sectional view of a sub 14 which carries a system constructed in accordance with the teachings of the present invention. The sub 14 preferably comprises a drill collar which is coupled between sections of drill pipe 18 or sections 41 of drill collar 15 above and below the sub 14. The borehole 12 penetrates the earth formations 24 which comprise, for purposes of illustration, a strata of sand 42 and a strata of shale 43 separated by a boundary layer 44. It is to be understood that presentation of the relationship between the layers 42 and 43 and the boundary region 44 is purely illustrative for purposes of description. In actuality, instead of the sharp definition of the regions shown, the geological constructs would be much more gradual.

It is well known in "downhole" technology that the physical characteristics of the earthen layers of different geological formations vary. Different ones of the formations, such as shales and sands, also have different permeabilities to the migration of charged particles through the material. That is, the formations tend to "filter" positive ions from within formation fluids which results in the collection of ions along the boundary layer between contiguous, dissimilar formations when the diffusion forces and electrical forces are balanced. Thus, as is illustrated in FIG. 2, the boundary region 44 between sand 42 and shale layer 43 results in the accumulation of positively charged ions 45 on one side of the boundary and the resulting accumulation of negatively charged particles 46 in the region on the other side of the boundary layer 44. In this manner, polarized charged layers result in the production of a spontaneous potential difference with respect to an arbitrary reference potential. In the present invention, this reference potential is selected to be at the surface of the well. The sub 14 comprises a cylindrical steel body 48 having an axial passageway 49 formed therethrough. The bore 49 permits the flow of drilling fluids down the drill string and out the drill bit 22 where it flows back to the surface through the annular region 16 between the sides of the sub 14 and the walls of the borehole 12. The annular region 16 is thus filled with conductive drilling fluids. Both the highly conductive steel string 16 and the conductive fluids within the annular region 16 then serve to essentially "short out" the minute potential differences due to the ionized regions 45 and 46.

Figure 3:
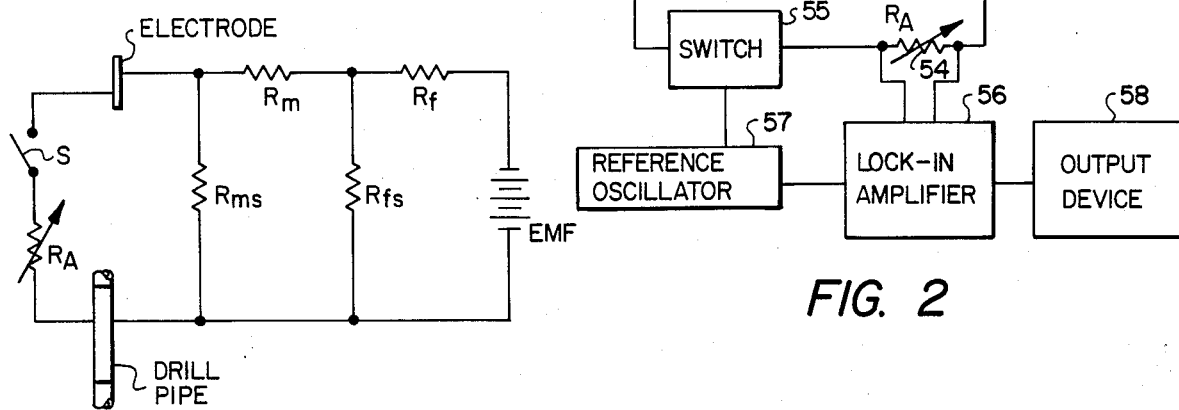
FIG. 3 is one embodiment of a schematic diagram used in illustrating the teachings of the system of the present invention.

Referring now to FIG. 3, there is shown an electrical model of the potentials and resistances between the ionized regions and the drill pipe located within the borehole. The battery potential, designated by EMF, is supplied through the electrical resistance of the series resistance of the formation represented by $R_f$. Connected directly across the EMF is also the shunt resistance effect of the formation designated by $R_{fs}$ which represents the current flow path between adjacent formations across the boundary layer. In addition, there is a series resistance effect of the conductive mud, represented by $R_m$ and a shunt resistance effect also due to the mud designated as $R_{ms}$. Finally, the system of the invention, as will be more fully explained below, includes an electrode in series connection with a switch "S", a variable ammeter resistor "$R_a$" and the drill pipe 15.

Referring back to FIG. 2, it is shown that the sub 14 includes a cylindrical recess 51 formed within the outer periphery which receives a body of insulating materials 52. The insulator 52 electrically isolates a cylindrical electrode 53 from the conductive body of the drill collar 15. The highly conductive drill string has a potential which is essentially the same as a reference potential located at the surface of the earth. Currents may thus flow between the electrode 53 and the body of the drill collar 15 when a path for that flow is provided. These currents will be directly related to the spontaneous potential of the formations directly adjacent the electrode 53, such as formation 43.

As shown in the lower block diagram portion of FIG. 2, an electrical path is provided from the electrode 53 through the ammeter resistance $R_a$ 54 through a switch 55 and back to the body of the conductive drill collar 15. The voltage drop across the ammeter resistor 54 is measured by a lock-in amplifier 56 which is synchronized with the operation of the switch 55 due to the fact that a common reference oscillator 57 is driving both elements. Finally, the amplified output signal is entered to an output device 58 which may be either a recorder or the encoding element of a telemetry system for sending output data to the surface for recording and analysis.

The switching of the ammeter resistor 54 into and out of the circuit affords a distinct advantage in this technique of measurement. Since the values of spontaneous potentials are very small, e.g., in the range of millivolts, the currents which flow through the ammeter resistor 54 are similarly very small. The currents are so small that they approach the level of noise inherent in any system operating in a downhole measuring-while-drilling environment. Thus, the use of a switch 55 which is interrupted at a preselectable frequency by varying the frequency of the reference oscillator 57, allows the lock-in amplifier 56 to be phase locked in a loop with the switch 55. This step filters a substantial amount of the inherent ambient noise in the system due to factors such as temperature variations and the like. In the present invention, it provides an enhanced level of accuracy in the measurement of the small potential drops across the ammeter resistor. Moreover, the variability and the selectable value of the variable ammeter resistor 54 enables a wide range of parameter variations to be selected. These act compatibly for maximum accuracy of measurement with the other values of resistance shown in FIG. 3. The other values must be estimated for given drilling mud compositions and different formation constituents.

It may also be seen that the variable ammeter resistor permits a dynamic measurement of the polarization time constant of the formations. This is effected by measuring the variation in the voltage value at various frequencies of interruption of the currents by the switch 55. It is known that a series connected resistor and capacitor have an inherent RC time constant which is a function of the value of the resistance and the capacitance. The value of the capacitance in the case of formation polarization is directly related to the charge accumulation at the boundary layers and the conductivity of the electrolytic fluid located within the formations. Thus, by varying the value of the ammeter resistor 54 and by varying the frequency of the reference oscillator 57, additional information may be gathered with respect to the configuration and migration of the charge dispersal within the overlying formation layers. It can thus be seen how both earth formation spontaneous potential as well as the polarization time constant of earth formation arrays may be evaluated by the system and method of the present invention.

It is thus believed that the operation and construction of the present invention will be apparent from the foregoing description. While the method and apparatus shown and described has been characterized as being preferred it will be obvious that various changes and modifications may be made therein without departing from the spirit and scope of the invention as defined in the following claims.

What is claimed is:

1. A system for measuring the spontaneous potential of earth formations which are at a certain electrical potential due to the concentration of ions within the formation, comprising:
   a conductive cylindrical section of drill string;
   a conductive electrode positioned adjacent, but insulated from, said conductive section of drill string, said electrode being in electrically conductive communication with conductive drilling fluids between the drill string and the earth formations forming the borehole walls;
   means for electrically connecting said conductive drill string and said electrode through an electrically conductive path therebetween, including switching means and a resistor connected in series therewith for selectively interrupting said conductive path; and
   means for measuring the current flow through said electrically conductive path when said electrode and said drill string are electrically connected, comprising means for measuring the potential across said resistor including a lock-in amplifier and a reference oscillator connected to both said switching means and said lock-in amplifier to interconnect said elements in a phased lock loop wherein voltage measurement across said resistor and interruption by said switching means are synchronized to eliminate noise, said current flow being indicative of the spontaneous potential of earth formations adjacent said electrode.

2. A system for measuring spontaneous potential earth formations as set forth in claim 1 wherein the resistance value of said resistor is variable.

3. A system for measuring the polarization time constant of earth formations exposed in a borehole adjacent a drill string disposed therein, said system comprising:
   a conductive cylindrical sub connected as part of said drill string;
   a conductive electrode positioned adjacent said sub and electrically insulated therefrom and in electrical communication with the potential of the formations adjacent the borehole;
   a selectively interruptable path between said conductive electrode and said conductive sub;
   means for interrupting said path at a pre-selected rate to thereby produce current flow through said path indicative of the time constant of said earth formation, said interrupting means comprising a switching means and a resistor connected in series therewith; and
   means for measuring the potential difference across said resistor when said conductive path is present, comprising a lock-in amplifier and a variable frequency oscillator connected to both said switching means and said lock-in amplifier to interconnect said elements in a phased lock loop wherein voltage measurement across said resistor and interruption by said switching means are synchronized to eliminate noise.

4. A system for measuring the polarization time constant of earth formations as set forth in claim 3 wherein said resistance value of said resistor and said frequency of said oscillator are both variable for providing measurements of the voltage value across said resistor at various resistances and various frequencies.

5. An improved method for measuring the spontaneous potential of earth formations within a borehole which formations are at a certain electrical potential due to the concentration of ions therein, said method being of the type wherein a conductive electrode is secured to and insulated from a conductive cylindrical section of drill string disposed within the borehole adjacent said earth formations, wherein the improvement comprises the steps of:
   providing an electrically conductive path between said electrode and said drill string;
   providing a resistor and switching means in series within said conductive path for selectively interrupting the current flow therethrough;
   providing a lock-in amplifier and reference oscillator connected to said switching means and said lock-in amplifier in said conductive path to interconnect said elements in a phased lock loop;
   measuring the current flow through said electrically conductive path when said electrode and said drill string are electrically connected by measuring the potential difference across said resistor, said current flow being indicative of the spontaneous potential of said earth formations adjacent said electrode; and
   synchronizing the interruption and measurement of voltage across said resistor to eliminate noise.

6. The method for measuring spontaneous potential as set forth in claim 5 including the step of varying the resistance of said resistor during sequential voltage measurements.

7. A method for measuring the polarization time constant of earth formations exposed in a borehole adjacent a drill string disposed therein, said method comprising the steps of:
   providing a conductive cylindrical sub connected as part of said drill string;
   providing a conductive electrode positioned adjacent said sub and electrically insulated therefrom in electrical communication with the potential of the adjacent borehole formation;
   providing an electrical communication path between said conductive electrode and said conductive sub;
   providing switching means and a resistor connected in series with said electrical path;
   providing a lock-in amplifier and a variable frequency oscillator connected to said switching means and said lock-in amplifier to interconnect said elements in a phase lock loop;
   interrupting said electrical path at a preselected rate to thereby produce current flow through said path indicative of the time constant of said earth formations;
   synchronizing said interruption of current flow and voltage measurements across said resistor to eliminate noise; and
   measuring the potential difference across said resistor when said conductive path is present.

8. The method for measuring polarization time constant as set forth in claim 7, including the step of varying the value of said resistor during measurements of voltage thereacross at various oscillator frequencies.

* * * * *